United States Patent [19]

Storrar

[11] Patent Number: 4,993,262
[45] Date of Patent: Feb. 19, 1991

[54] APPARATUS FOR MONITORING FLOW OF A FLUID ALONG A CONDUIT

[76] Inventor: Andrew M. Storrar, 11 Torpel Way, Maxey, Peterborough PE6 9EQ, Great Britain

[21] Appl. No.: 187,526

[22] PCT Filed: Aug. 25, 1987

[86] PCT No.: PCT/GB87/00600
§ 371 Date: Jun. 28, 1988
§ 102(e) Date: Jun. 28, 1988

[87] PCT Pub. No.: WO88/01729
PCT Pub. Date: Mar. 10, 1988

[30] Foreign Application Priority Data

Aug. 28, 1986 [GB] United Kingdom ............... 8620812

[51] Int. Cl.⁵ .............................................. G01F 3/18
[52] U.S. Cl. ........................................ 73/242; 73/249
[58] Field of Search ............... 73/239, 242, 243, 247, 73/248, 249

[56] References Cited

U.S. PATENT DOCUMENTS

| 97,097 | 11/1869 | Leach | 73/243 |
|---|---|---|---|
| 157,472 | 12/1874 | Huntington | 73/243 |
| 1,974,202 | 9/1934 | Blum | 73/243 |
| 2,103,492 | 12/1937 | McCandless | 73/242 |
| 3,001,400 | 9/1961 | Graaf | 73/242 |
| 3,334,203 | 8/1967 | Sargent | . |
| 3,344,667 | 10/1967 | Maltby | 73/239 |
| 3,916,931 | 11/1975 | Shaw et al. | 73/249 |
| 4,192,185 | 3/1980 | Keilholz | 73/243 |

FOREIGN PATENT DOCUMENTS

8403765 9/1984 European Pat. Off. .
98572 10/1898 Fed. Rep. of Germany .

Primary Examiner—Herbert Goldstein
Attorney, Agent, or Firm—Bernard, Rothwell & Brown

[57] ABSTRACT

Apparatus 1 for monitoring flow of fluid, such as domestic water, along a conduit 2 comprising a piston and cylinder arrangement 3 having a plurality of free pistons 4 and 5, and port means 6 which are so arranged with respect to the pistons 4 and 5 that an inlet port is always open during strokes of each piston 4 or 5 so that fluid flow is continuous along the conduit 2.

25 Claims, 6 Drawing Sheets

APPARATUS FOR MONITORING FLOW OF A FLUID ALONG A CONDUIT

The invention relates to apparatus for monitoring flow of a fluid along a conduit, and to a system including such apparatus.

The conduit may contain water or gas, which is for example part of a domestic water or gas supply.

Present flow meters for water flow measurement do not lend themselves without considerable increasing in manufacturing costs to high accuracy at low flow rates, generally are not susceptible of supporting a remote information logger, and in any event do not readily meet the criteria laid down in BS 5728 (amendment 1-1985) Class D. Domestic water flow meters according to this standard are required to have a nominal flow rate of 1.0 m$^3$/hr.

This requires a starting flow rate of 0.00375 m$^3$/h, a minimum flow rate of 0.0075 m$^3$/h, above which accuracy is to be within +/−5% rate to a transiton flow rate of 0.0115 m$^3$/h, above which accuracy is to be within +/−2% rate to a maximum flow rate of 2.0 m$^3$/h. Pressure loss accordingly is to be a maximum of 1 bar at the maximum flow rate and a maximum of 0.25 bar at the nominal flow rate.

Domestic water pipework internal diameter is in the United Kingdom nominally 15 mm with a tolerance of +/−1 mm. At minimum and maximum flow rates, mean fluid pipework velocities are therefore 0.012 m/s and 3.14 m/s based on 15 mm dia.

Corresponding Reynolds numbers with water at ambient conditions are 135 and 36,000. The flow in the pipework therefore goes from laminar to turbulent over the flow range.

Turndown: maximum flow rate/minimum flow rate is very high at 267:1.

The present flow meters used in the United Kingdom and elsewhere, are generally rotary piston meters. They usually comprise a cylindrical measurement chamber with a partition plate separating the inlet from the outlet port. The piston is also cylindrical and has numerous holes in its support so that liquid is able to flow on both sides of the piston. The piston is guided within the measuring chamber by the circulation of the piston hub or peg between an outer and inner boss. The slot in the piston for the partition plate confines motion relative to the plate to one plane. The motion of the piston is thus oscillatory.

As the flow meter entraps fixed quantities of liquid outside and inside the piston each revolution, the rate of flow is proportional to rotational velocity.

Operation of this meter over a wide turndown depends on close tolerances to give sufficiently low internal leakage especially as the leakpaths are constrained to be short relative to breadth because of the rounded geometry. Furthermore the tolerance structure is complex to keep mechanical friction low. For example the tolerances on the piston hub, the internal diameter of the outer boss confining its path, the OD of the piston and the ID of the measuring chamber must be such that the piston outer circumference does not touch and hence rub on the inside circumference of the measuring chamber. Otherwise mechanical friction will go up.

This is because the constraining forces are designed to be taken by the hub on the ID of the outer boss, which confines them to a smaller radius arm, so keeping friction torque down. Conversely the piston outer circumference must be close enough to the inner circumference of the measuring chamber to keep internal leakage low.

To achieve Class D Specifications and retain existing maximum flow capability the meter would require even tighter tolerances. Without some form of compensating measure, tightening the clearance between the OD of the piston and the ID of the measuring chamber would reduce life as less wear at the hub would be required to make the circumferences touch and frictional torque increase. In order to control the complex tolerance structure of this meter cost would considerably increase, with no guarantee on accuracy being increased commensurately.

Moreover, it has been estimated that in the Thames Water Authority area alone there could be a significant drop in demand (present day) if there was adoption of universal metering.

It is accordingly an object of the invention to seek to mitigate the disadvantages of the prior meter and to provide a meter, particularly for monitoring the flow of domestic water, which has improved accuracy at low flow rates, is cheaper to manufacture and install than the present meter, which is capable of supporting a remote information logger and which would be acceptable to the consumer.

According to a first aspect of the invention there is provided apparatus for monitoring flow of fluid along a conduit, comprising a piston and cylinder arrangement having a plurality of free pistons, and port means which are so arranged with respect to the pistons that an inlet port is open during strokes of each piston so that fluid flow is continuous along the conduit.

One free piston may act as the valving for another and vice-versa.

There may be two pistons.

The pistons may be double-acting.

The two pistons may be mounted in a single cylinder with a divider therebetween to provide a respective cylinder part for each piston.

The two pistons may each be mounted in a respective separate cylinder.

The cylinder parts or cylinder may be coaxial.

The cylinder parts or cylinder may comprises two spaced apart shells which are coaxial, and there may be radial partitions between the shells whereby to provide the port means.

Each piston may comprise equal diameter piston parts connected by reduced section piston parts.

The cylinder may be terminated at opposite ends by manifolds which may extend substantially parallel to one another and to the divider.

Each manifold may have an extension adapted for connection into the conduit.

The extensions may be adapted for coaxial connection with the conduit by screw-threaded connections.

The cylinder may comprise moulded components.

The components may be extruded aluminium components, or may be plastic components, such as injection mouldings.

According to a second aspect of the invention there is provided a system for measuring flow of liquid along a conduit, comprising apparatus as hereinbefore defined and means to sense displacement of the pistons whereby to determine flow of fluid along the conduit.

The sensing means may comprise an optical sensing means, a magnetic sensing means, a mechanical sensing means or a capacitative sensing means.

The conduit may contain water.

Apparatus embodying the invention is hereinafter described, by way of example, with reference to the accompanying drawings.

In the drawings, like parts are identified by like reference numerals.

Referring firstly to FIGS. 1-4 of the drawings, there is shown apparatus 1 for monitoring flow of fluid, such as domestic water, along a conduit 2 (shown in dashed lines) comprising a piston and cylinder arrangement 3 having a plurality of free pistons, in the embodiment shown two pistons 4 and 5, and port means 6 which are so arranged with respect to the pistons 4 and 5 that an inlet port is always open during strokes of each piston 4 or 5 so that fluid flow is continuous along the conduit 2.

The piston and cylinder arrangement 3 comprises two cylinder parts 7 and 8 which are coaxial, the parts 7 and 8 being separated by a ported divider 9. The cylinder parts 7 and 8 comprise two coaxial shells 10 and 11, the annular space 12 between which comprise the port means, with radial walls 13 between the shells 10 and 11 (forming impermeable barriers between different ports of the port means 6 (the ports in the shell 10 being omitted from FIG. 1 for clarity)). Each piston 4 and 5 comprises three disc-shaped parts 14 which are parallel of identical diameter, spaced apart and joined by integral connector pieces 15 of reduced diameter. The disc-shaped parts 14 are of such a diameter that they just provide a sliding fit within the inner (as considered in use) shell 10. The inner and outer shells 10 and 11 are of substantially the same length and are terminated by manifolds 16 comprising double-walled ported plates which are substantially parallel to the divider 9 and which include extensions 17 secured to the cylinder 3 by bolts 18, and which have coaxial extensions 19, adapted by threaded external surfaces 20, for connection with the conduit 2 and coaxial therewith. Water thus flows down the conduit 2, through the apparatus 1, which is in-line with the conduit 2. There is means (not shown) for sensing movement of at least one piston 4 or 5 whereby to measure water flow, and thus consumption, movement of a piston 4 or 5 being dependent on water flow, and thus water consumption. The apparatus 1 with the sensing means thus provides a measuring system. The sensing means may be optical, magnetic, mechanical, capacitative or any other suitable means, and can also provide an LCD read-out or any other suitable means either at the meter or at a remote point, or both. The cylinder parts 7 and 8, pistons 4 and 5, partition 9 and manifolds 16 may comprise mouldings, for example plastic or aluminium, and may be injection mouldings. This provides for simplicity and repeatability of construction and use and simplicity of manufacture.

In use, the apparatus 1 is mounted in-line in a domestic (say) water supply conduit 2 via the extensions 19. Movement of the pistons 4 and 5 is described with reference to the schematics of FIG. 4, which shows the cylinder split into two notional cylinder parts for simplicity. The left hand extension 19 (as viewed) is assumed to be upstream and the right hand extension downstream, the manifolds respectively adjacent thereto being at A and D. Assuming the pistons 4 and 5 are in their respective positions shown, inlet water is blocked from inlet port I1 of the port means 6 by the central disc 14 of the piston 4. The water therefore flows into I2, where it finds the inlet port open. It flows through cylinder part 8 to port H of the port means 6, and returns in direction of arrow 'R' to port B of the port means 6, so pushing the piston 4 to the left as viewed. Water is forced out of port A, by this action and hence passes into port G of the cylinder part 8 to the outlet port O3 and hence down the conduit 2. During the later part of the movement of the piston 4, the path between inlet port I1 and port F opened. Water passes from F into port C in the direction of arrow 'S' to start movement of the piston 5 to the right as viewed, piston 5 so closing off ports I2 and O3 after the piston 4 has reached the end of its stroke. Water is forced from port D of the port means 6 into E and out of O1. During the later part of the movement of piston 5, the path between inlet port I2 and port G is opened. Water passes through G into port A to restart movement of the piston 4, to the right as viewed, so that the piston 4 closes off ports I1 and O1 after the piston 5 has reached the end of the stroke. When the piston 4 has nearly reached the end of its stroke to the far right as viewed, water again passes from I1 through E to D to reverse the piston 5. The pistons 4 and 5 thus move freely to and fro within their respective cylinder parts 7 and 8, one piston acting as a valve for the other during this movement as they work in quadrature, and an inlet port of the port means 6 always being open, unobstructed by a piston 4 or 5 so that water flow is continuous. The port means 6 positioning is such that each piston 4 or 5 travels substantially a full stroke, even at low flow rates.

Figure 1:
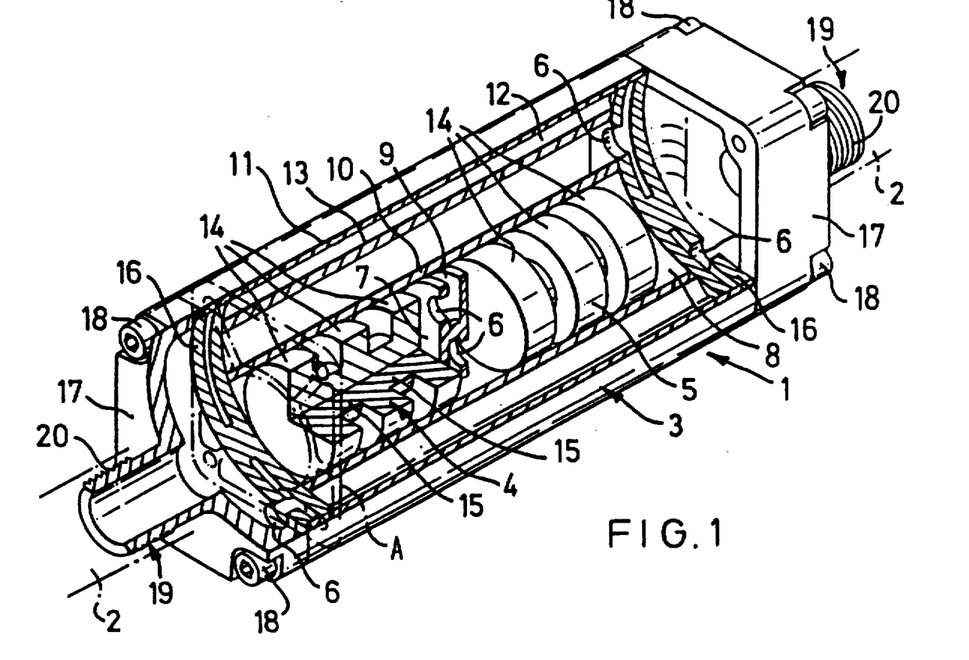
FIG. 1 is perspective, part sectional view, of apparatus according to the invention.
Figures 2, 3:
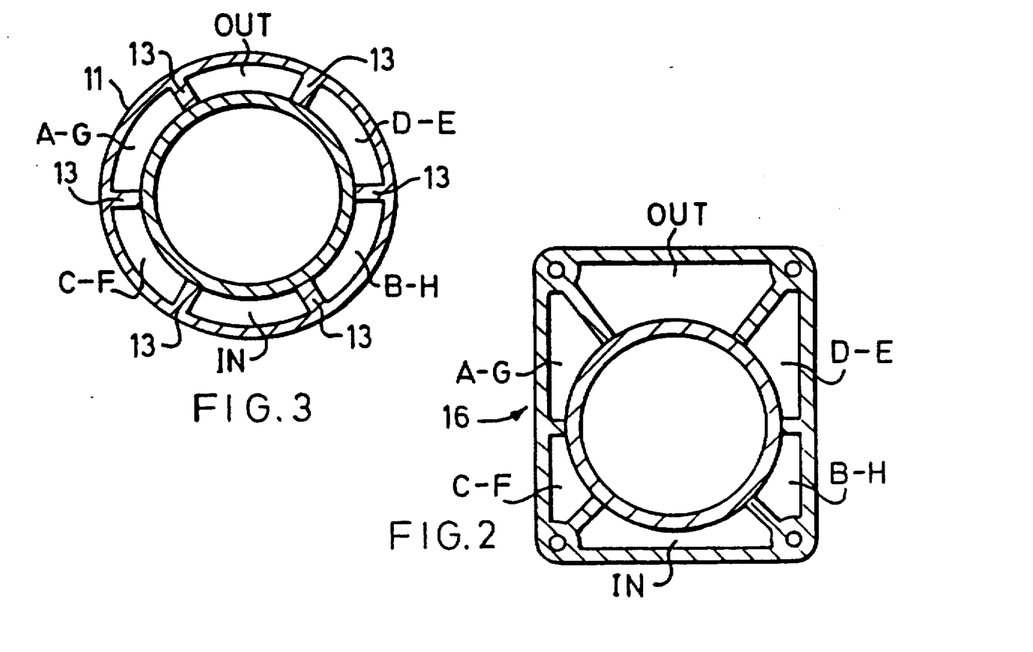
FIG. 2 is a cross-sectional view taken at plane A in FIG. 1, of a cylinder of the apparatus of FIG. 1.
FIG. 3 is a cross-sectional cylinder configuration of an alternative view of the apparatus of FIG. 1.
Figure 4:
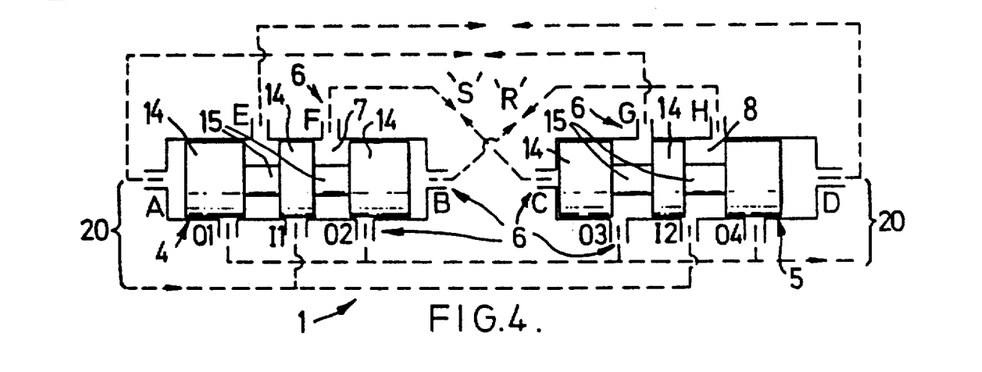
FIG. 4 is a schematic flow diagram of a sequence of operations of the apparatus of FIG. 1.
Figure 5:
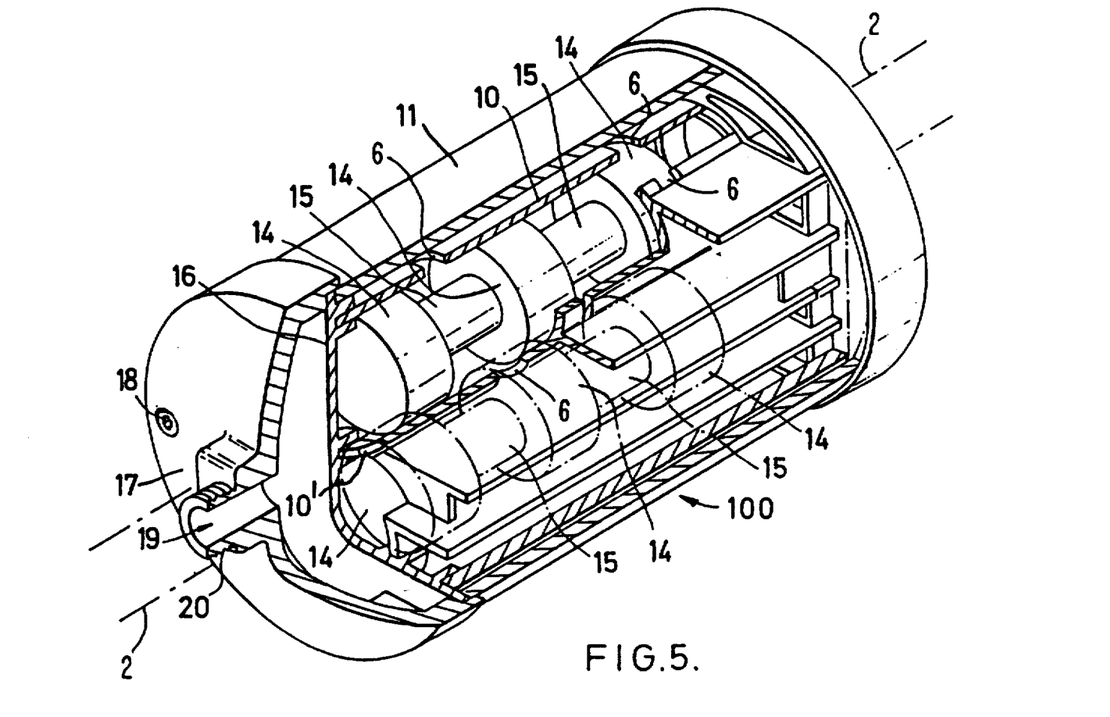
FIG. 5 is a perspective, part sectional view of a second apparatus according to the invention.
Figure 6:
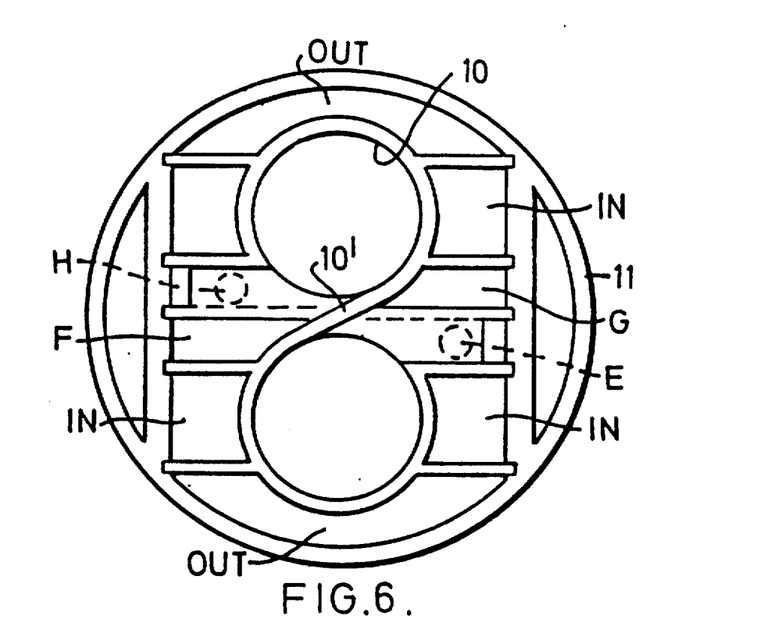
FIG. 6 is an end view of the cylinder parts of the apparatus of FIG. 5.
Figure 7:
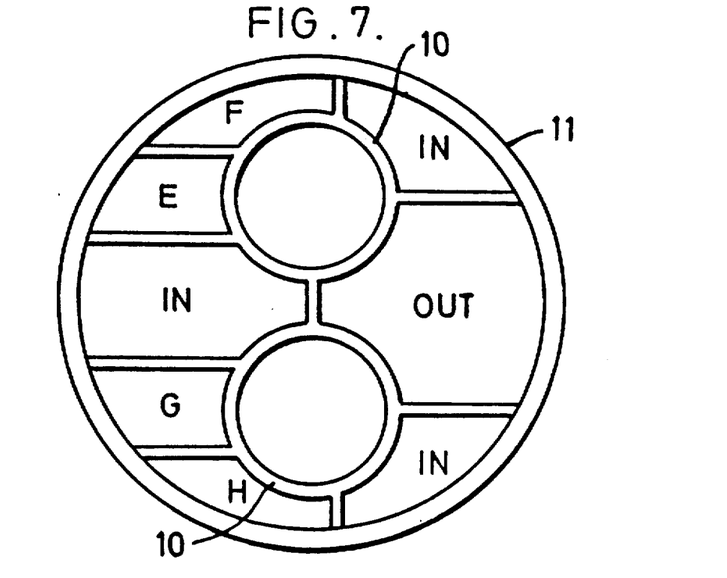
FIG. 7 is an end view of an alternative configuration of cylinder parts of the apparatus of FIG. 5.

Referring now to FIGS. 5-7 of the drawings, there is shown apparatus 100 for monitoring flow of fluid, such as domestic water, along a conduit 2 (shown in dashed lines) comprising a piston and cylinder arrangement 3 having a plurality of free pistons, in the embodiment shown two pistons 4 and 5, and port means 6 which are so arranged with respect to the pistons 4 and 5 that an inlet port is always open during strokes of each piston 4 or 5 so that fluid flow is continuous along the conduit 2.

The piston and cylinder arrangement 3 comprises two cylinder parts 7 and 8 which are parallel, and the interiors of which are in fluid interconnection via port means 6. The cylinder parts 7 and 8 comprise two shells 10 and a shell 11. In FIG. 6 the shells 10 have S-shaped extension 10' to provide the end port means 6. In FIG. 7 the end port means 6 are provided by the manifolds 16 which have appropriate transverse walls for guiding fluid between the shells 10. There are walls or webs 13 between the shells 10 and 11 (forming impermeable barriers between different ports of the port means 6). Each piston 4 and 5 comprises three disc-shaped parts 14 which are parallel of identical diameter, spaced apart and joined by integral connector pieces 15 of reduced diameter. The disc-shaped parts 14 are of such a diameter that they just provide a sliding fit within the shells 10. The inner and outer shells 10 and 11 are of substantially the same length and are terminated by the manifolds 16 which latter include extensions 17 secured to the cylinder 3 by bolts 18, and which have coaxial extensions 19, adapted by threaded external surfaces 20, for connection with the conduit 2 and coaxial therewith. The apparatus 100 thus comprises two pistons 4, 5, and a cylinder block 10 and 13 and a casing 11 which may be moulded from plastic as for example by extrusion. The apparatus also includes two tube plates of the manifolds 16 and the two end covers 17.

There is means (not shown) for sensing movement of at least one piston 4 or 5 whereby to measure water flow, and thus consumption, movement of a piston 4 or 5 being dependent on water flow, and thus water consumption. The apparatus 1 with the sensing means thus provides a measuring system. The sensing means may be optical, magnetic, mechanical, capacitative or any other suitable means, and can also provide an LCD read-out or any other suitable means either at the meter or at a remote point, or both. The cylinder parts 7 and 8, pistons 4 and 5, and manifolds 16 may comprise mouldings, for example plastic or aluminium, and may be injection mouldings. This provides for simplicity and repeatability of construction and use and simplicity of manufacture.

Figure 8:
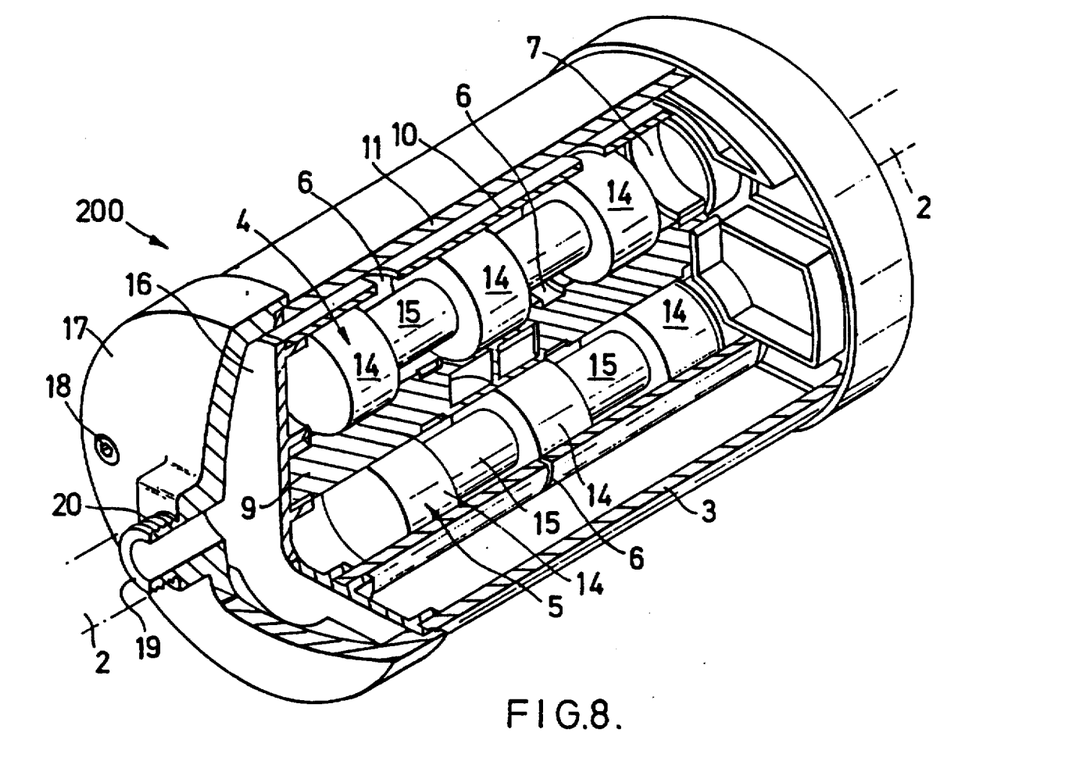
FIGS. 8 and 9 are perspective, part cross-sectional views of further apparatus according to the invention.
Figure 9:
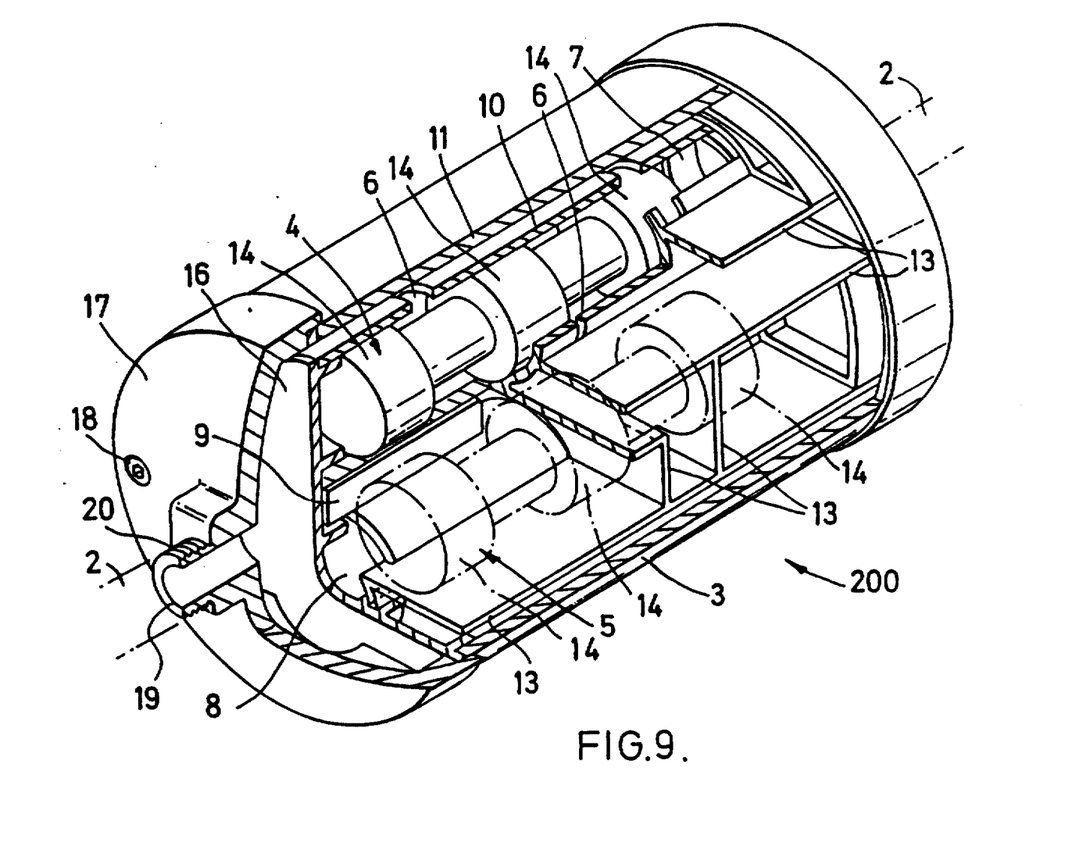

FIGS. 8 and 9 show apparatus 200 similar to the apparatus 100 in that there is a cylinder block moulded from plastics or aluminium as by extrusion, although in this embodiment there is a ported divider separating the cylinder parts 7 and 8. The embodiment 200 of FIGS. 8 and 9 is otherwise similar to that of FIG. 5.

Figure 10:
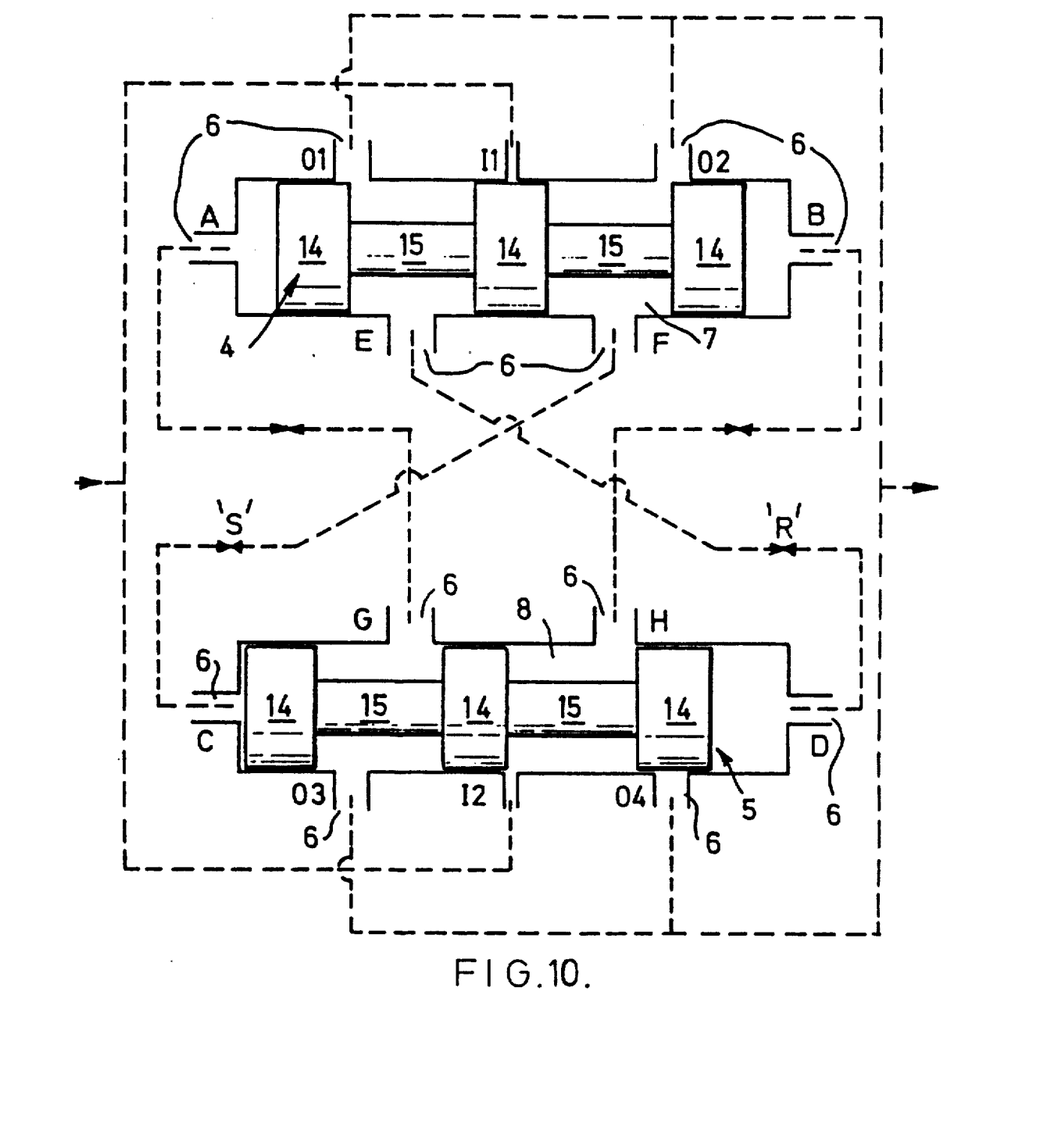
FIG. 10 is a schematic flow diagram of a sequence of operations of the apparatus of FIG. 5.

In use, the apparatus 100 or 200 is virtually identical to the embodiment of FIGS. 1 to 4 in that it is mounted in-line in a domestic (say) water supply conduit 2 via the extensions 19. Water thus flows down the conduit 2, through the apparatus 100 or 200, which is in-line with the conduit 2. Movement of the pistons 4 and 5 is described with reference to the schematics of FIG. 10, which shows the cylinder split into two notional cylinder parts for simplicity. As in the embodiment of FIGS. 1 to 4, the left hand extension 19 (as viewed) is assumed to be upstream and the right hand extension downstream, the manifolds respectively adjacent thereto being at A and D. Assuming the pistons 4 and 5 are in their respective positions shown, inlet water is blocked from inlet port I1 of the port means 6 by the central disc 14 of the piston 4 as in FIGS. 1 to 4. The water therefore flows into I2, where it finds the inlet port open. It flows through cylinder part 8 to port H of the port means 6, and returns in direction of arrow 'R' to port B of the port means 6, so pushing the piston 4 to the left as viewed. Water is forced out of port A, by this action and hence passes into port G of the cylinder part 8 to the outlet port O3 and hence down the conduit 2. During the later part of the movement of the piston 4, the path between inlet port I1 and port F opened. Water passes from F into port C in the direction of arrow 'S' to start movement of the piston 5 to the right as viewed, piston 5 so closing off ports I2 and O3 after the piston 4 has reached the end of its stroke. Water is forced from port D of the port means 6 into E and out of O1. During the later part of the movement of piston 5, the path between inlet port I2 and port G is opened. Water passes through G into port A to restart movement of the piston 4, to the right as viewed, so that the piston 4 closes off ports I1 and O1 after the piston 5 has reached the end of the stroke. When the piston 4 has nearly reached the end of its stroke to the far right as viewed, water again passes from I1 through E to D to reverse the piston 5. The pistons 4 and 5 thus move freely to and fro within their respective cylinder parts 7 and 8, one piston acting as a valve for the other during this movement as they work in quadrature, and an inlet port of the port means 6 always being open, unobstructed by a piston 4 or 5 so that water flow is continuous. The port means 6 positioning is such that each piston 4 or 5 travels substantially a full stroke, even at low flow rates.

At all times in every embodiment one or both of the pistons 4 or 5 is or are clear of an inlet port such that water flow is continuous and one piston commences a new stroke before the other has finshed its current stroke. Also, water between the end faces of the pistons 4 and 5 and the respective end parts of the apparatus (the divider and manifolds) means that there is a cushion of water which effectively prevents any percussive effect of the pistons 4 and 5 engaging the cylinder parts while the pistons are effectively "coupled" by the relatively incompressible water to provide positive displacement of the pistons, the movement of only one of which need be sensed, as the pistons are in phase, to provide a measurement which can simply be related to fluid flow. The flow rate of the water, and thus quantity of water used, can readily be ascertained by measuring movement of a piston by a non-intrusive device. Volumetric output is digital, based on the number of strokes of a piston. It is possible to adjust the size of the apparatus 1, 100 or 200 so that a pulse (one complete cycle of four strokes) corresponds to a verification scale interval at which speed of operation is assessed as 5 cycles/sec. at the nominal desired flow rate of 1.0 m$^3$/h.

In every embodiment the cylinder 3 may be transparent, to provide for direct visual/optical measurement of movement of a piston 4 or 5.

Modifications of the apparatus disclosed may, it will be understood, be envisaged. For example, the cushioning effect provided by the water may be achieved by mechanical means such as valve means or an elastomeric or rubber end cap or seat on the piston and/or end port means 6.

I claim:

1. An apparatus for measuring flow of a fluid along a conduit, comprising
    a piston and cylinder arrangement having a plurality of cylinder sections and a piston freely slidable in each respective cylinder section;
    said arrangement having a main inlet and a main outlet for being connected in series with the conduit;
    each of the cylinder sections having an inlet valve port communicating with the main inlet, two bidirectional valve ports communicating with respective ends of the other cylinder section, and outlet valve port means communicating with the main outlet;
    each of the plurality of pistons including valve operator means whcih (a) connects the inelt valve port to one of the bidirectional valve ports and connects the other bidirectional valve port to the outlet valve port means when the piston is at one end of the cylinder section, (b) closes the inlet valve port when the piston is at an intermediate position in th e cylinder section, and (c) connects the inlet valve port to the other bidirectional port and connects the one bidirectional port to the outlet valve port means when the piston is at the other end of the cylinder section;

said valve ports, said valve port means and said valve operator means being such as to alternately move each piston of the plurality of pistons;

means for sensing movement of at least one of the pistons to measure the flow of the fluid;

said valve operator means of each piston including cylindrical end piston portions, a cylindrical intermediate piston portion, and shaft means connecting the end piston portions to the intermediate piston portion;

each inlet valve port being positioned in the wall of the cylinder section so as to be opened on a respective side of the intermediate piston portion when the piston is at either end position;

each of the bidirectional valve ports being open on respective opposite sides of the intermediate piston portion at any position of the piston; and each outlet valve port means including two outlet valve ports opened when the corresponding end piston portion is at its end position but closed by the corresponding end piston portion when the corresponding end piston portion is spaced from its end position.

2. An apparatus according to claim 1, wherein the cylinder sections are formed by a single cylinder block with a divider to provide the respective cylinder sections.

3. An apparatus according to claim 2, wherein the cylinder sections are coaxial.

4. An apparatus according to claim 3, wherein the cylinders comprise two spaced apart shells which are coaxial, and radial partitions between the shells to provide passages forming portions of the valve ports and the valve port means.

5. An apparatus according to claim 3, wherein the cylinder block is terminated at opposite ends by manifolds which extends substantially parallel to one another and to the divider.

6. An apparatus according to claim 5, wherein each manifold has an extension adapted for connection into the conduit.

7. An apparatus according to claim 6, wherein the extensions include screw-threaded connections adapted for coaxial connection with the conduit.

8. An apparatus according to claim 1, wherein the cylinder sections are formed by respective separate cylinder blocks.

9. An apparatus according to claim 8, wherein the cylinder sections are substantially parallel.

10. An apparatus according to claim 9, wherein the cylinder block is terminated at opposite ends by manifolds which extend substantially parallel to one another.

11. An apparatus according to claim 10, wherein the cylinder block comprises the cylinder sections, a shell encompassing the cylinder sections, and webs spacing the shell from the cylinder sections.

12. An apparatus according to claim 11, wherein the webs with the cylinder sections and the shell provide passages forming portions of the valve ports and the valve port means.

13. An apparatus according to claim 12, wherein the cylinder sections, the shell and the webs are integral.

14. An apparatus according to claim 1, wherein the piston portions comprise equal diameter piston portions and the shaft means comprise reduced section piston parts.

15. An apparatus according to claim 1, including a combined inlet and outlet means for connection with the conduit.

16. An apparatus according to claim 1 wherein the piston and cylinder arrangement includes a cylinder comprising molded components.

17. An apparatus according to claim 16, wherein the molded components are extruded aluminum components.

18. An apparatus according to claim 16, wherein the molded components are plastic components.

19. An apparatus according to claim 18, wherein the plastic components are injection moldings.

20. An apparatus according to claim 18, wherein the plastic components are extrusions.

21. An apparatus according to claim 1, wherein the sensing means comprises an optical sensing means.

22. An apparatus according to claim 1, wherein the sensing means comprises a magnetic sensing means.

23. An apparatus according to claim 1, wherein the sensing means comprises mechanical sensing means.

24. An apparatus according to claim 1, wherein the sensing means comprises a capacitive sensing means.

25. An apparatus according to claim 1, wherein the conduit contains water.

* * * * *